United States Patent [19]

Babicz et al.

[11] 4,360,838

[45] Nov. 23, 1982

[54] MEANS AND METHOD FOR MOUNTING CATHODE RAY PICTURE TUBES

[75] Inventors: Michael Babicz; Carl Campisi; Joseph E. Josephs, all of Chicago, Ill.

[73] Assignee: Zenith Radio Corporation, Glenview, Ill.

[21] Appl. No.: 293,076

[22] Filed: Aug. 17, 1981

[51] Int. Cl.³ .......................................... H04N 5/645
[52] U.S. Cl. .................................. 358/248; 358/245; 358/247; 358/254; D14/34
[58] Field of Search ............... 358/248, 254, 249, 247, 358/245, 246; 312/7.2; 220/2.1 A, 2.3 A; D14/84

[56] References Cited

U.S. PATENT DOCUMENTS

| | | | |
|---|---|---|---|
| D. 185,297 | 5/1959 | Mason | D14/84 |
| 3,136,850 | 6/1964 | Blaker | 358/248 |
| 3,175,036 | 3/1968 | Miller, Jr. | 358/248 |
| 3,297,895 | 1/1967 | Salners | 358/248 |
| 3,318,999 | 5/1967 | Taylors | 358/248 |
| 3,614,519 | 10/1971 | Figlewicz et al. | 358/248 |
| 3,643,020 | 2/1972 | St. George et al. | 358/248 |
| 3,651,257 | 3/1972 | Soetz | 358/248 |
| 3,712,958 | 1/1973 | Stute | 358/248 |
| 4,247,871 | 1/1981 | Hirsch et al. | 358/248 |

FOREIGN PATENT DOCUMENTS 1432208  4/1976  United Kingdom ............... 358/248

*Primary Examiner*—Robert L. Griffin
*Assistant Examiner*—Edward L. Coles
*Attorney, Agent, or Firm*—Ralph E. Clarke, Jr.

[57] ABSTRACT

Improved cathode ray tube centering and support devices are disclosed for use in a television receiver cabinet having an escutcheon (devices) with an opening for conformally receiving and accomodating the substantially rectangular face panel of the tube. Corner guide devices rearwardly extending from the opening in the escutcheon provide for guiding each corner of the face panel into the opening. A plurality of tapered ribs projecting inwardly from each of the cradling devices provide for exerting a progressively increasing force fit on the face panel. Devices are provided for forcing, or otherwise urging, the corners forwardly into the corner guide devices and the tapered ribs. As the corners of the face panel are forced into the corner guide devices, the tapered crush ribs yield and conform to the contours of the corners, effectively centering the tube in the escutcheon (devices) and the cabinet, and providing for the firm retention of the tube in the cabinet.

6 Claims, 13 Drawing Figures

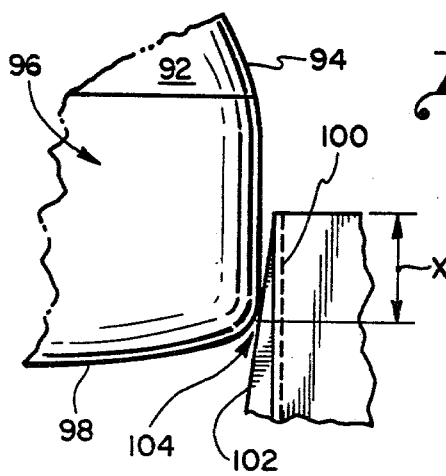
Fig. 6
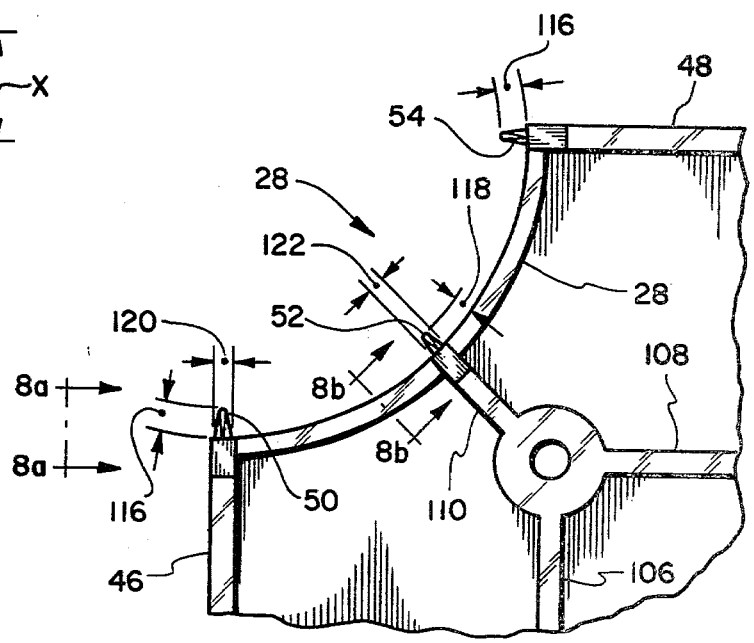
Fig. 7
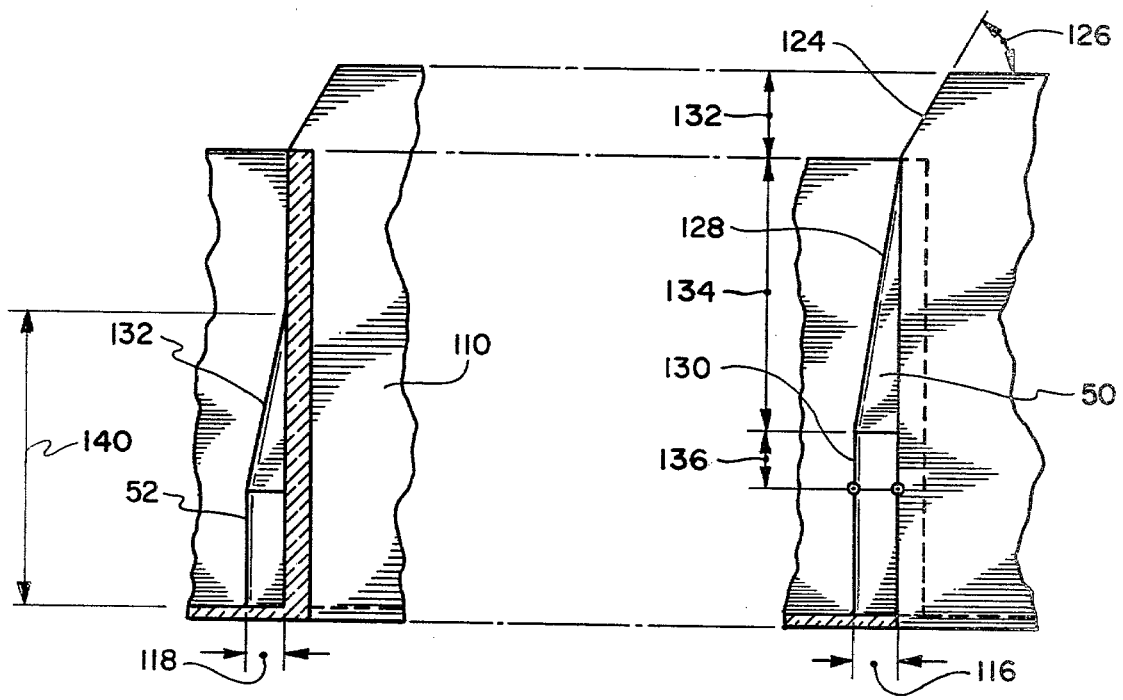
Fig. 8b
Fig. 8a

MEANS AND METHOD FOR MOUNTING CATHODE RAY PICTURE TUBES

BACKGROUND OF THE DISCLOSURE AND PRIOR ART STATEMENT

This disclosure relates generally to television receivers, and is particularly directed to mounting of cathode ray tubes in receiver cabinets.

A television receiver commonly consists of a cabinet made of wood, metal or a plastic having an open back for access to the components. The largest of these components is the cathode ray picture tube which has a substantially rectangular face panel with a rearwardly extending flange encircled by a tension band, and attached to a funnel portion and a neck portion oriented on the axis of the tube. The electronic section of the receiver is usually subdivided into parts placed at convenient locations beneath and at the sides of the cathode ray tube. The open back is normally covered by a panel that restricts access to the components.

The large face plate on which the broadcast television picture is reproduced, is viewed through a frontal escutcheon means with an opening for conformally receiving the cathode ray tube face panel. The face panel, which is normally oriented so as to be flush with the front of the cabinet, or slightly recessed therein, is supported and framed by the escutcheon, which is cast or otherwise formed from metal or plastic. The escutcheon also serves to cover the gap between the face plate and the cabinet front.

The awkward configuration, and the bulk and weight of the cathode ray picture tube makes it difficult to mount in the cabinet. And it is considered best that it be firmly mounted, yet without such a concentration of pressure at the mounting points that the brittle glass envelope is cracked or fractured. Also, it is preferable that the tube be firmly mounted so as ato be resistant to the shock which results from handling and shipping; such shock can result in tube breakage, or equally serious, the permanent displacement of the spring-mounted shadow mask in the color tube. To ameliorate the effects of rough handling of the receiver, resilient means for absorbing shock have been introduced into prior art tube-mounting means. An example is the mounting bracket disclosed by Goetz, Jr. in U.S. Pat. No. 3,651,257 wherein the bracket includes a pivotable portion coverable with a shock absorbent band for providing a soft engaging contact with the front screen of the picture tube. Another example is disclosed by Hirsch et al in U.S. Pat. No. 4,247,871, wherein a sealing gasket serves to resiliently mount the face plate section in conjunction with a color filter.

The problems of mounting cathode ray picture tubes are aggravated by the tolerance variations of manufactured tubes. As a practical matter, it is impossible to cast or mold the face plate-and flange sections to exact dimensions, as the glass will shrink unpredictably as it cools. The circumference of a nineteen-inch tube, for example, will vary by as much as ±78 mils, and the mounting means must be able to accommodate this range. Face panels of picture tubes of like diagonal dimension characterized by this exhibiting of relatively dissimilar circumferential dimensions, can be classified as under-, normal-, and over-sized panels.

Another problem is implicit in the sheer weight of the cathode ray tube, especially those of larger size (e.g., fifty-five pounds for the twenty-three-inch tube) making it mandatory that the mounting means be able to tolerate a force of at least the 30 g's commonly experienced during shipment.

Other prior art setting forth cathode ray tube mounting means includes the following:

St. George et al—U.S. Pat. No. 3,643,020 discloses a wire loop means for mounting a picture tube.

Stute—U.S. Pat. No. 3,712,958 discloses a picture tube escutcheon mounting member which, in addition to providing means for mounting the escutcheon, serves by its resiliency to cushion the picture tube from fortuitous shocks to the cabinet.

OBJECTS OF THE INVENTION

It is a general object of this invention to provide for improved mounting of cathode ray tubes in television receiver cabinets.

It is a less general object of this invention to reduce the cost of manufacturing assembly of television receivers.

It is a more specific object of this invention to enhance resistance to cathode ray tube breakage during shipment of television receivers.

It is a specific object of this invention to provide for a significant reduction in the cost of installing cathode ray tubes in television receiver cabinets during manufacture.

It is another specific object to provide for a simplifying assembly of a television receivers.

It is yet another specific object of the invention to provide for exact centering of cathode ray tubes in television receiver cabinets.

It is a further specific object to provide for compensating for dissimilar circumferential dimensions in cathode ray tube face panels during mounting of such tubes.

BRIEF DESCRIPTION OF THE DRAWINGS

The appended claims set forth those novel features believed characteristic of the invention. However, the invention itself, as well as further objects and advantages thereof, will best be understood by reference to the following detailed description of a preferred embodiment taken in conjunction with the accompanying drawings, in which:

FIG. 6 is an enlarged view of a corner section of a tube component showing the function of another aspect of the invention;

FIG. 7 is a detail view of a component according to the invention shown by FIG. 3; and, FIGS. 8A and 8B are side views in elevation of two components according to the invention, but greatly enlarged to show additional details; FIG. 8A is taken along lines 8A—8A of FIG. 7, and FIG. 8B is taken along lines 8B—8B of FIG. 7.

DESCRIPTION OF THE PREFERRED EMBODIMENTS

Figure 1B:
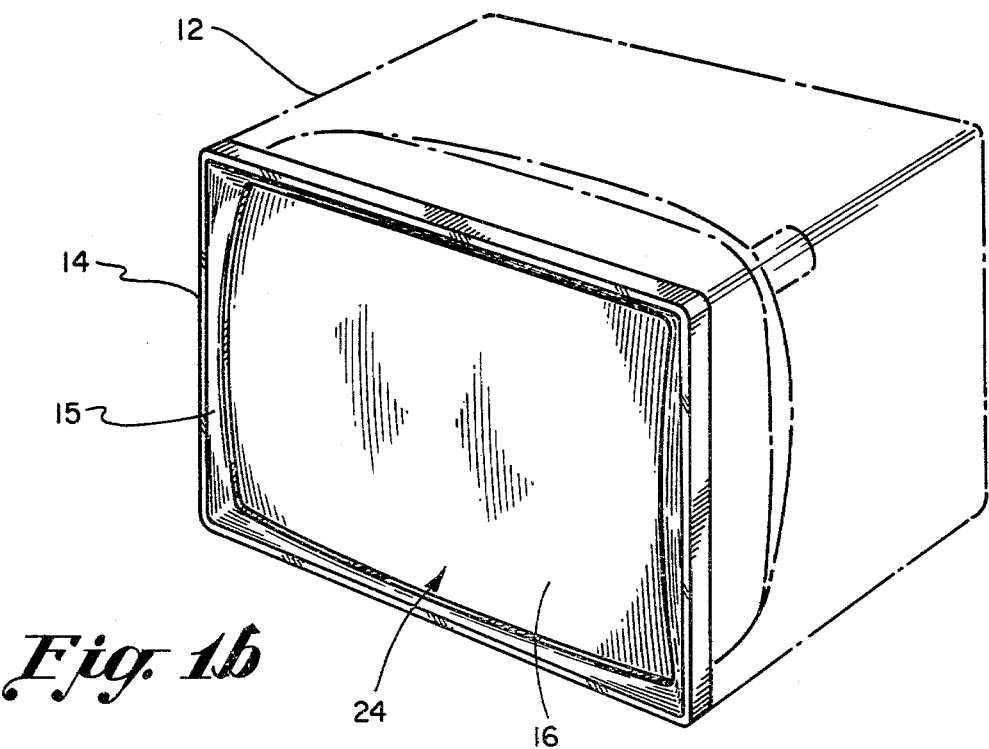
FIG. 1B shows in perspective a frontal view of the means shown by FIG. 1A.
Figure 1A:
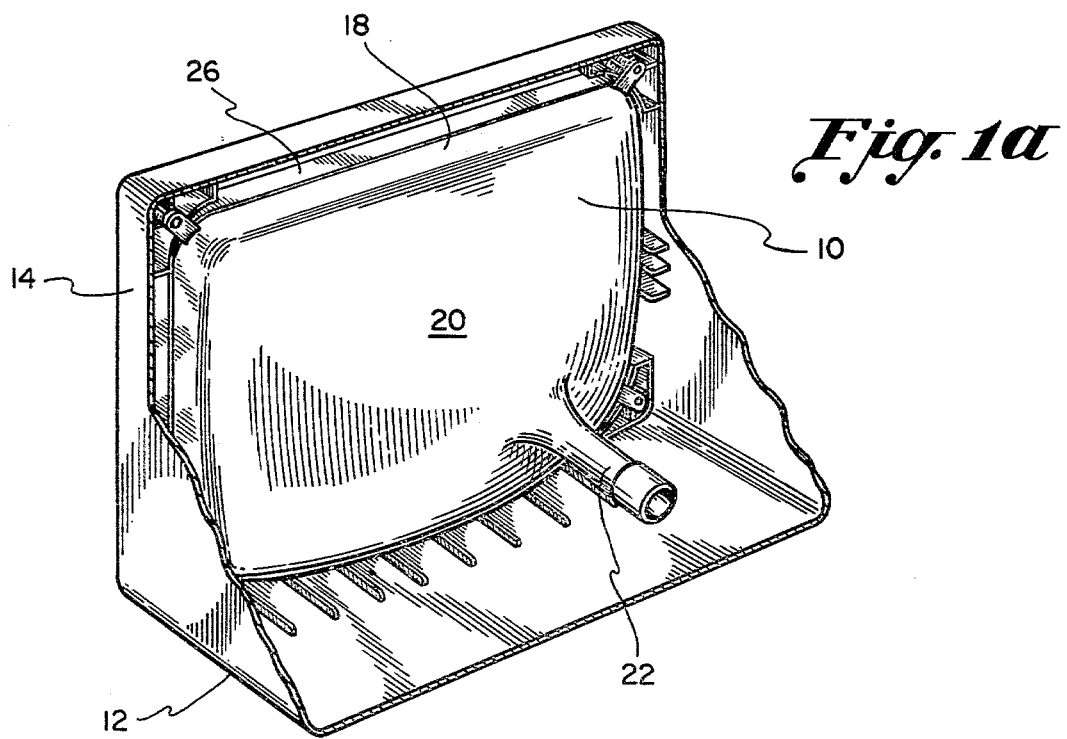
FIG. 1A is a view in perspective depicting the means for mounting a cathode ray tube according to the invention.

In FIGS. 1A and 1B there is depicted a cathode ray picture tube 10 mounted in a television receiver cabinet 12, the outlines of which are schematically indicated by dash lines. The cabinet 12 indicated will be recognized as that of a "table model" television receiver in which an escutcheon 14 forms the entire front of cabinet 12. In a larger console television cabinet (not shown) the escutcheon 14 forms a part of the front panel of the cabinet.

Cathode ray picture tube includes a face panel 16, a flange 18 rearwardly extending from the face panel, a funnel 20, and a narrow neck 22. The front 15 of escutcheon 14 is depicted as having an opening 24 for conformally receiving the substantially rectangular face panel 16. Flange 18 is shown as being encircled with a tension band 26 that serves to inhibit, by inwardly exerted pressure, the effect of tube envelope implosion, as is well known in the art.

Figure 2:
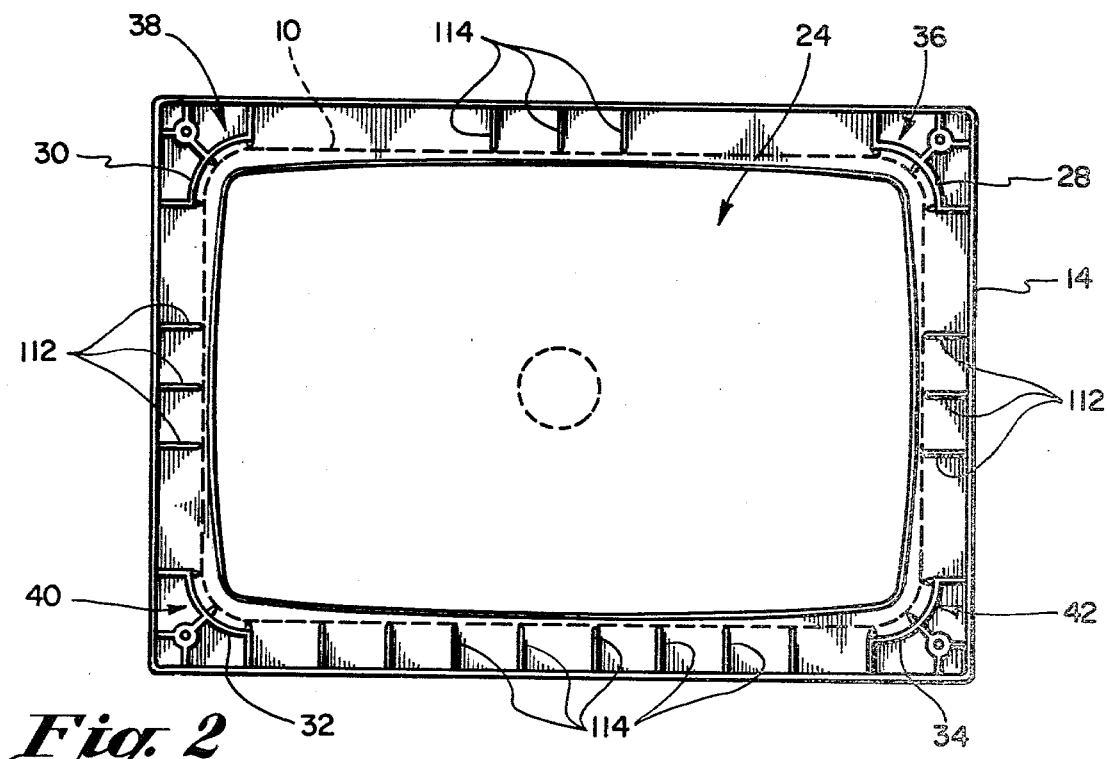
FIG. 2 is a plan view of a tube mounting component according to the invention.

Please refer now to FIG. 2 wherein the escutcheon 14 is depicted as seen from the back of the receiver 12, with the outlines of cathode ray tube 10 indicated schematically by dash lines. Corner guide means 28, 30, 32 and 34 according to the invention are shown as rearwardly extending from the opening 24 in escutcheon 14 for guiding each of the corners 36, 38, 40 and 42 of face panel 16 into the opening 24.

Figure 3:
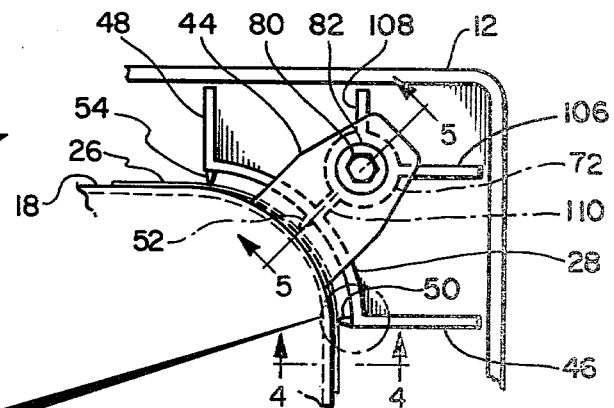
FIG. 3 is an enlarged view of a corner section of the component shown by FIG. 2.

FIG. 3 is a plan view depicting in greater detail one corner guide means 28 according to the invention in relation to corner 36 of face panel 16. Tension band 26 is indicated as providing for retention of L-shaped mounting ear 44, one leg of which is not shown because it is positioned between tension band 26 and flange 18; the tension band 26 serves to clamp the leg against flange 18 by inward pressure, as is well known in the art. Corner guide means 28 is strengthened by buttressing ribs 46 and 48, which enable corner guide means 28 to resist the outward pressure exerted by the face panel during the tube mounting process according to the invention. Corner guide means 28 according to the invention further includes at least two axially oriented, malleable ribs projecting inwardly from each of the corner guide means; three ribs 50, 52 and 54 are shown in this preferred embodiment of the invention. Two of the ribs—ribs 50 and 54—provide for exerting a progressively increasing force fit, or centering pressure, on the face panel 16 as it is inserted, as will be described. The center rib 52 is a support rib of different configuration and function, as will also be described.

Figure 3A:
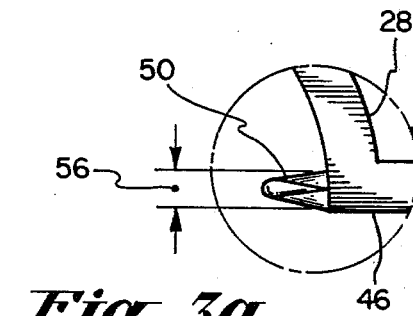
FIG. 3A shows a further enlargement of a detail of FIG. 3.

The generally triangular configuration of rib 50 (and identical rib 54) is indicated by FIG. 3A, which is an enlarged view of rib 50. The width 56 of rib 50 (and 54) is about 0.040 inch.

Figure 4:
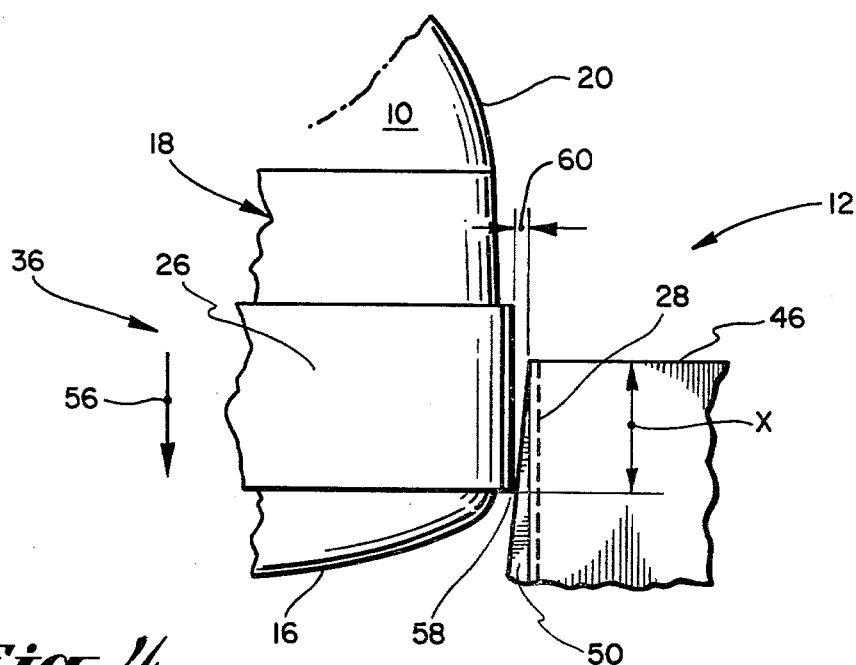
FIGS. 4, and 4A–4B, are elevational views taken along lines 4—4 of FIG. 3, and showing further details of the mounting means according to the invention.
Figure 4A:
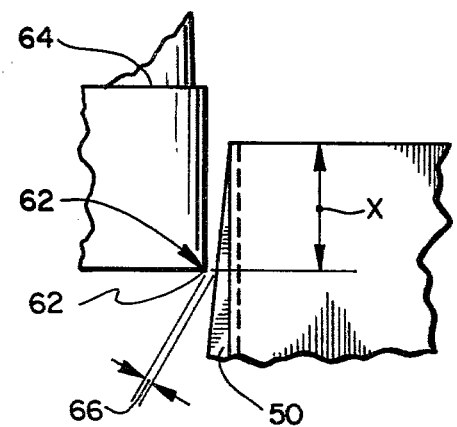
Figure 4B:
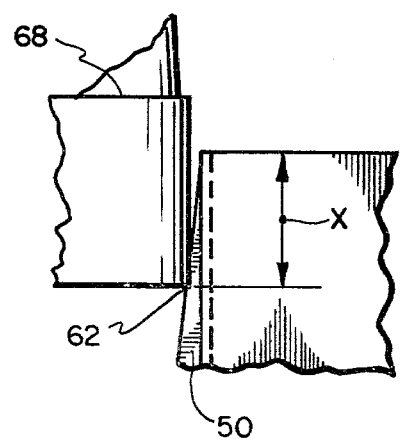

FIGS. 4, 4A and 4B depict schematically the rearward taper of representative rib 50, and indicate the function of the tapered ribs according to the invention in centering and supporting a cathode ray tube in a cabinet. A corner 36 of tube 10 is shown as being urged forwardly into the corner guide means 28, as indicated by arrow 56. An edge 58 of tension band 26 is shown as making contact with rib 50.

As has been noted, the circumference of 19-inch tubes, for example, can vary as much as ±0.078 inch. Other tube sizes of like diagonal measure, such as the 13-inch, the 17-inch, and the 23-inch tubes will also vary relatively widely in circumferential dimension. The face panel 16 and associated tension band 26 shown by FIG. 4 represents a "normal-sized" tube wherein there is about 0.030 inch clearance (ref. No. 60) between the cradling means 28 and tension band 26 at distance "x" along rib 50. "X" represents the maximum distance along rib 50 which the edge 58 of tension band 26 will travel when the tube hold-down means is fully tightened, as will be described. It will be noted that the edge 58 of tension band 26 comes to rest against tapered rib 50; rib 50 (and all other ribs of this type according to the invention) effectively center tube 10 in the escutcheon 12 when the corners of the tube are forced, or otherwise urged, forwardly into the corner guide means, thus providing support as well as centering for the tube.

The relationship of a tube having an under-sized face panel with the tapered ribs according to the invention is depicted by FIG. 4A. At distance "x", the edge 62 of tension band 64 of the under-sized tube is indicated as being clear of contact with representative rib 50; the clearance (ref. No. 66) in this example is about 0.016 inch. Although firm contact of corner 62 of tension band 64 with the ribs is not attained, the slight clearance indicated does not appreciably affect the integrity of the mounting according to the invention.

The relationship of a tube having an over-sized face panel with the tapered ribs according to the invention is shown by FIG. 4B. Representative rib 50 now becomes a "crush rib" and is shown as being altered, or crushed, by the edge 67 of tension band 68 when the over-sized face panel is forced forwardly by distance "x", effectively centering and supporting the tube in the escutcheon.

Figure 5:
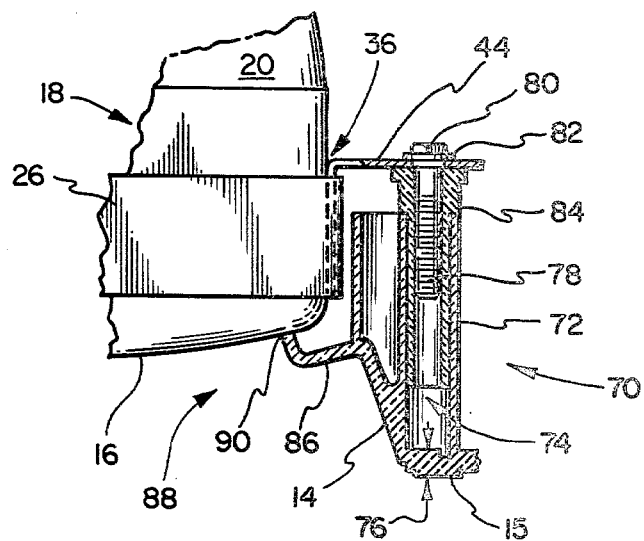
FIG. 5 is a partly sectioned view in elevation of component hold-down means taken along lines 5—5 of FIG. 3.

A preferred means of urging or otherwise forcing the corners of a cathode ray tube into the corner guide means according to the invention is depicted in FIG. 5. The corner 36 of face panel 16 and flange 18, and funnel 20 of cathode ray tube are depicted in relation to a preferred tube hold-down, or retention, means 70, one of which is located adjacent to each of the corners of face panel 16. Tube hold-down means 70 comprises a hollow boss 72 extending rearwardly from the front section of escutcheon 14. The large diameter center hold 74 is preferably cored to the thickness 76 of the wall of the front, preventing heat sinking to the front 15. The large diameter of hole 74 requires a core in the form of a steel pin which because of its bulk will not overheat during the molding cycle. By this means the molding process is improved.

Spacer 78 is inserted into hole 74 for receiving hold down screw 80 and is bonded to hollow boss 72. A washer 82 is located at the interface of the spacer section 84 and the head of hold down screw 80. As holddown screw 80 is tightened, pressure is exerted on mounting ear 44, forcing the corner 36 into corner guide means 28 according to the invention; the same action takes place with regard to corners 38, 40 and 42 as the respective hold-down screws are rotated. Mounting ear 44 is preferably relatively thin; that is, about 0.047 inch in thickness, allowing it to flex as screw 80 is tightened so it will exert the uniform pressure on the front 15 of cabinet 12. Lip 86 extends into the "crater" 88 of the front 15. Lip 86 is made flexible to accommodate the large variation in diameter of cathode ray tube face panels. For example, contact point 90 of lip 86 can move by the flexing of lip 86 to accomodate, in conjunction with the flexing provided by mounting ear 44, a range of tube tolerances from a 0.03 inch gap to a 0.128 inch interference. The hole in mounting ear 44 for receiving screw 80 is preferably made substantially larger in diameter than screw 80. By this provision, when tube 10 is mounted according to the invention, the tube can seek the center of the escutcheon without its movement in transversal directions being inhibited.

The escutcheon 14 may be molded from a high-heat, high-impact polystyrene such as type No. XP6021-01, or 6075, supplied by Dow Chemical Company, Des Plaines, Ill. These plastics are malleable under pressure such as exerted by a tension band. These plastics also have resilient properties, providing a substantial measure of shock absorption to the picture tube. Other plastics with similar properties may be utilized. The parts of hold-down means 70 may be molded from a polystyrene.

The cathode ray tube centering and support means according to the invention is not limited to tubes having a tension band. Cathode ray tubes used in smaller television receivers and display monitors may be supplied without such a band. The beneficial effect of the means according to the invention in relation to a band-less tube having an over-sized panel is indicated by FIG. 6. A cathode ray tube 92 is shown as having a funnel 94 joined to the flange 96 of a face panel 98. Corner guide means 100 has a plurality of tapered ribs, one of which is indicated by ref. No. 102. An edge 104 of face panel 98 is depicted as making contact with tapered rib 102 at the aforecited distance "x". As the hold-down screw is tightened (please refer to FIG. 5 and the associated description), edge 104 of face panel 98 will be forced forwardly into corner guide means 100. Although crush rib 102 will not be "cut" as has been shown in FIG. 4B with respect to a tube having a tension band, yet the malleable ribs according to the invention will substantially deform and provide firm retention of the tube.

With reference again to FIG. 3, it will be noted that hollow boss 72 is supported in radial direction by buttressing ribs 106 and 108. Buttressing rib 110 is depicted as providing additional support for the corner guide means 28 and associated rib 52 against the outward pressure that results as the corner 36 of an over-sized face panel 16 is forced into the corner guide means 28. Additional buttressing is shown as being molded into the escutcheon 14 as indicated by ribs 112 at the sides of escutcheon 14 (see FIG. 2), and ribs 114 at the top and bottom of escutcheon 14. It will be noted that ribs 112 and 114 do not make contact with tube 10.

The dimensions and values cited in this disclosure apply to a cathode ray tube of 19-inch diagonal measure. These dimensions and values can be scaled up or down for tubes of larger or smaller diagonal measure by one skilled in the art. Also, the dimensions and values are provided by way of example only, and are in no way limiting.

FIG. 7 is a view of corner guide means 28 showing the configuration of the respective parts in greater details. It will be observed that tapered ribs 50 and 54 become "crush" ribs, and yield and conform to the corners of an over-sized tube according to the invention, while center rib 52 serves primarily to provide a measure of support to the respective corner, usually without being caused to yield and to conform to the corner. Ribs 50 and 54, for example, preferably project inwardly from corner guide means 28 a distance of 0.104 inch (ref. No. 116), while center rib 52 projects inwardly 0.060 inch (ref. No. 118), by way of example.

The width of ribs 50 and 54 is preferably about 0.050 inch (ref. No. 120), and the width of center rib 52 may be about 0.040 inch (ref. No. 122). The apex of each rib is preferably rounded to a radius of about 0.010 inch.

The tapered configuration of ribs 50 and 54 and center rib 52 according to the preferred embodiment of the invention, is shown in detail in two profile views in FIG. 8, taken along lines 8A—8A and lines 8B—8B respectively, of FIG. 7.

With regard to tapered rib 50 (and all other ribs of the type), the angle of the tapered rearwardly located section 124 crush rib 50 is indicated by way of example as being 60 degrees (ref. No. 126), or about 30 degrees with respect to the vertical. This angle of the rib provides for accepting the face panel during installation. The angle of forwardly located section 128 is about 9 degrees with respect to the vertical; this angle provides for centering and supporting the face panel. The draft of section 130 is about thirty minutes, and is provided for molding purposes. Tapered section 124 extends about 0.200 inch (ref. No. 132), section 128 extends about 0.650 inch (ref. No. 134), and section 130 extends about 0.100 inch (ref. No. 136), for a total of about one inch.

Rib 52 shown by FIG. 8B is depicted as having a section 138 having an angle of about 11 degrees with respect to the vertical. Rib 52 extends about 0.75 inch (ref. No. 140). It will be noted that rib 52 has associated therewith a tapered rearwardly located section 142 which has, like rearwardly located section 124, the function of accepting the face panel during installation.

The angles of the tapers of the ribs provide for accepting and centering without alteration of the ribs the under- and normal-sized tubes, but provide for altering of the malleable ribs by crushing when accepting over-sized tubes, according to the invention.

While particular embodiments of the invention have been shown and described, it will be obvious to those skilled in the art that changes and modifications may be made without departing from the invention in its broader aspects, and therefore, the aim of the appended claims is to cover all such changes and modifications as fall within the true spirit and scope of the invention.

We claim:

1. In a television receiver cabinet having frontal escutcheon means with an opening for conformally receiving and framing a substantially rectangular cathode ray tube face panel of oversize circumference, improved centering and support means for said cathode ray tube comprising:
   corner guide means rearwardly extending from said opening in said escutcheon means for guiding each corner of said face panel into said opening;
   a plurality of tapered crush ribs projecting inwardly from each of said corner guide means for exerting a progressively increasing force fit on said face panel;
   means for forcing said corners of said tube forwardly into said corner guide means and said tapered crush ribs;
   retention means for retaining said corners in said corner guide means and said tube in said cabinet;
   such that as said corners of said face panel are forced into said corner guide means, said tapered crush ribs yield and conform to the contours of said corners, effectively centering said tube in said escutcheon means and said cabinet, and providing for the firm retention of said tube in said cabinet.

2. For use in the installation of cathode ray picture tubes of like diagonal dimension in television receiver cabinets, said picture tubes having a substantially rectangular face panel with a rearwardly extending flange, said cabinets including a frontal escutcheon means with an opening for conformally receiving and framing a cathode ray tube face panel, said face panels of said picture tubes being characterized by exhibiting relatively dissimilar circumferential dimensions classifiable as under-, normal-, and over-sized panels, improved centering and support means for accepting and accommodating any of said panels of said tubes, comprising:

corner guide means rearwardly extending from said opening in said escutcheon means for guiding each corner of a face panel into said opening;

at least one centering means projecting inwardly from each of said corner guide means, said centering means having at least one taper for centering said corner and said tube in said escutcheon means, the angle of said taper providing for accepting without alteration of said centering means said under- and normal-sized panels, said angle providing also for the yielding and conforming of said centering means to accommodate said over-sized panels;

means for urging said corners of said tube into said corner guide means and said centering means;

retention means for retaining said corners in said corner guide means and said tube in said cabinet;

such that as the corners of a face panel are urged into said corner guide means, under- and normal-sized panels are centered in said escutcheon, and an over-sized panel causes said centering means to yield and conform to the contours of its corners, effectively centering such tubes in said escutcheon means of said cabinet.

3. For use in a television receiver cabinet, escutcheon means frontally located in said cabinet and having an opening for conformally receiving the substantially rectangular face panels of cathode ray tubes of like diagonal dimension, said face panel having a rearwardly extending flange encircled by a tension band, said tube including a conjoined funnel portion and neck portion oriented on the axis of said tube, said face panels exhibiting relatively dissimilar circumferential dimensions classifiable as under-, normal, and over-sized panels, said escutcheon means being characterized by having means for accepting and accommodating any of said sizes of said panels of said tubes comprising:

corner guide means rearwardly extending from said opening in said escutcheon means for guiding each corner of a face panel into said opening;

at least one centering means projecting inwardly from each of said corner guide means, said centering means having at least one taper for centering said corner and said tube in said escutcheon means, the angle of said taper providing for accepting without alteration of said centering means said under- and normal-sized panels, said angle providing also for the yielding and conforming of said centering means to accommodate said over-sized panels;

means for urging said corners of said tube into said corner guide means and said centering means;

retention means for retaining said corners in said corner guide means and said tube in said cabinet;

such that as the corners of a face panel are urged into said corner guide means, said under- and normal-sized panels are centered in said escutcheon, and an over-sized panel causes said centering means to yield and conform to the contours of its corners, effectively centering such tubes in said escutcheon means of said cabinet.

4. For use in the installation of cathode ray picture tubes of like diagonal dimension in television receiver cabinets, said picture tubes having a substantially rectangular face panels with a rearwardly extending flange encircled by a tension band, and attached to a funnel portion and a neck portion oriented on the axis of said tube, said cabinets including frontal escutcheon means with an opening for conformally receiving and framing a cathode ray tube face panel, said face panels of said picture tubes being characterized by exhibiting relatively dissimilar circumferential dimensions classifiable as under-, normal-, and over-sized panels, improved centering and support means for accepting and accommodating any of said sizes of said panels of said tubes, comprising:

corner guide means rearwardly extending from said opening in said escutcheon means for guiding each corner of a face panel into said opening;

at least two axially oriented, malleable ribs projecting inwardly from each of said corner guide means for exerting progressively increasing centering pressure on said face panel, said ribs having tapered sections including angles with respect to the vertical as follows:

a rearwardly located section having an angle of about 30 degrees for accepting said face panel;

a forwardly located section having an angle of about 9 degrees for centering said face panel;

means for urging said corners of said tube into said corner guide means and said centering means;

retention means for retaining said corners in said corner guide means and said tube in said cabinet;

such that the angles of said taper of said ribs provide for accepting and centering without alteration of said ribs said under- and normal-sized tubes, but provide for alteration of said malleable ribs by crushing by said tension band when accepting said over-sized tubes.

5. For use in the assembly of a television receiver having a cabinet including frontal escutcheon means with an opening for conformally receiving the substantially rectangular face panel of a cathode ray tube, a method of supporting and centering said tube, comprising:

molding said escutcheon means from a malleable plastic deformable under pressure;

providing guide means in said escutcheon means for each corner of said tube, and rearwardly extending said guide means from said opening;

projecting a plurality of tapered crush ribs inwardly from each of said guide means, and orienting said crush ribs to exert a progressively increasing force fit on said corners of said face panel;

guiding said corners of said face panel forwardly into said corner guide means;

forcing said corners into said corner guide means and retaining said corners therein;

such that as said corners of said face panel are forced into said corner guide means, said tapered rib means yield and conform to the contours of said corners, effectively centering and retaining said tube in said escutcheon means and said cabinet.

6. For use in the assembly of a television receiver having a cabinet including frontal escutcheon means with an opening for conformally receiving the substantially rectangular face panel of a cathode ray tube, said panel having a rearwardly extending flange encircled by a tension band, a method of supporting and centering said tube, comprising:

molding said escutcheon means from a malleable plastic deformable under pressure;

providing guide means in said escutcheon for each corner of said tube, and rearwardly extending said guide means from said opening;

projecting a plurality of tapered crush ribs inwardly from each of said guide means, and orienting said crush ribs to exert a progressively increasing force fit on said corners of said face panel;

guiding said corners of said face panel forwardly into said corner guide means;

forcing said corners into said corner guide means and retaining said corners therein;

such that as said corners of said face panel are forced into said corner guide means, said tapered rib means deform under the pressure of said tension band and conform to the contours of said corners, effectively centering and retaining said tube in said escutcheon means and said cabinet.

* * * * *